US012650774B2

(12) United States Patent
Kim et al.

(10) Patent No.: US 12,650,774 B2
(45) Date of Patent: Jun. 9, 2026

(54) COMPUTING DEVICE AND METHOD THEREOF FOR A PROMOTION METHOD IN A TIERED MEMORY SYSTEM

(71) Applicants:Samsung Electronics Co., Ltd., Suwon-si (KR); Uif (University Industry Foundation), Yonsei University, Seoul (KR)

(72) Inventors: Minjae Kim, Seoul (KR); Won Woo Ro, Seoul (KR); Kyeonghoon Lim, Seoul (KR); Jiwon Lee, Seoul (KR)

(73) Assignees: SAMSUNG ELECTRONICS CO., LTD., Suwon-si (KR); Uif (University Industry Foundation), Yonsei University, Seoul (KR)

( * ) Notice: Subject to any disclaimer, the term of this patent is extended or adjusted under 35 U.S.C. 154(b) by 45 days.

(21) Appl. No.: 18/935,606

(22) Filed: Nov. 3, 2024

(65) Prior Publication Data

US 2025/0217040 A1      Jul. 3, 2025

(30) Foreign Application Priority Data

Dec. 27, 2023      (KR) ........................ 10-2023-0193178

(51) Int. Cl.
*G06F 3/06*              (2006.01)
(52) U.S. Cl.
CPC .......... *G06F 3/0613* (2013.01); *G06F 3/0659* (2013.01); *G06F 3/0673* (2013.01)

(58) Field of Classification Search
CPC .... G06F 3/0613; G06F 3/0659; G06F 3/0673; G06F 3/0644; G06F 3/0604; G06F 3/061; G06F 3/0647; G06F 3/0658; G06F 3/0685
See application file for complete search history.

(56) References Cited

U.S. PATENT DOCUMENTS

| | | | | |
|---|---|---|---|---|
| 7,529,903 | B2 * | 5/2009 | Boss ..................... | G06F 3/0647 711/165 |
| 9,274,941 | B1 | 3/2016 | Throop et al. | |
| 10,444,996 | B2 * | 10/2019 | Cashman ............... | G06F 3/061 |
| 10,860,244 | B2 | 12/2020 | Pham et al. | |
| 11,200,005 | B2 | 12/2021 | Patel et al. | |
| 11,379,381 | B2 * | 7/2022 | Han ..................... | G06F 1/3275 |
| 11,467,751 | B2 | 10/2022 | Dalmatov | |
| 2009/0043831 | A1 * | 2/2009 | Antonopoulos ...... | G06F 3/0614 |
| 2012/0324163 | A1 * | 12/2012 | Sato .................... | G06F 11/2071 711/E12.017 |
| 2015/0169621 | A1 * | 6/2015 | Ouyang .............. | G06F 16/1827 707/827 |
| 2019/0205040 | A1 * | 7/2019 | Gao ..................... | G06F 3/0679 |
| 2019/0332536 | A1 * | 10/2019 | Allen ................... | G06F 3/0649 |

(Continued)

FOREIGN PATENT DOCUMENTS

| | | |
|---|---|---|
| KR | 10-2020-0085522 A | 7/2020 |
| KR | 10-2697902 B1 | 8/2024 |

*Primary Examiner* — Sean D Rossiter
(74) *Attorney, Agent, or Firm* — Muir Patent Law, PLLC

(57) ABSTRACT

A method of operating a computing device according to an aspect of the inventive concept may include accessing a page of a second tier memory, checking a time taken for the access, checking a total number of accesses of the page based on the time taken for the access, and determining whether to terminate promotion of the page to the first tier memory and a timing of the promotion, based on the total number of accesses of the page.

20 Claims, 10 Drawing Sheets

(56)     References Cited

U.S. PATENT DOCUMENTS

| | | | |
|---|---|---|---|
| 2019/0361622 A1* | 11/2019 | Hasegawa | G06F 16/18 |
| 2021/0191632 A1* | 6/2021 | Lee | G06F 3/0625 |
| 2023/0031304 A1* | 2/2023 | Aguilera | G06F 9/5016 |
| 2023/0044342 A1 | 2/2023 | Wilkinson | |
| 2023/0141682 A1* | 5/2023 | Youn | G06F 3/0659 |
| | | | 711/154 |
| 2023/0315320 A1* | 10/2023 | Seyedzadeh | G06F 3/0604 |
| | | | 711/154 |
| 2024/0329849 A1* | 10/2024 | Mori | G06F 3/0673 |
| 2025/0266117 A1* | 8/2025 | Bastoni | G11C 29/1201 |
| 2025/0284641 A1* | 9/2025 | Wasef | G06F 3/0679 |

\* cited by examiner

FIG. 9

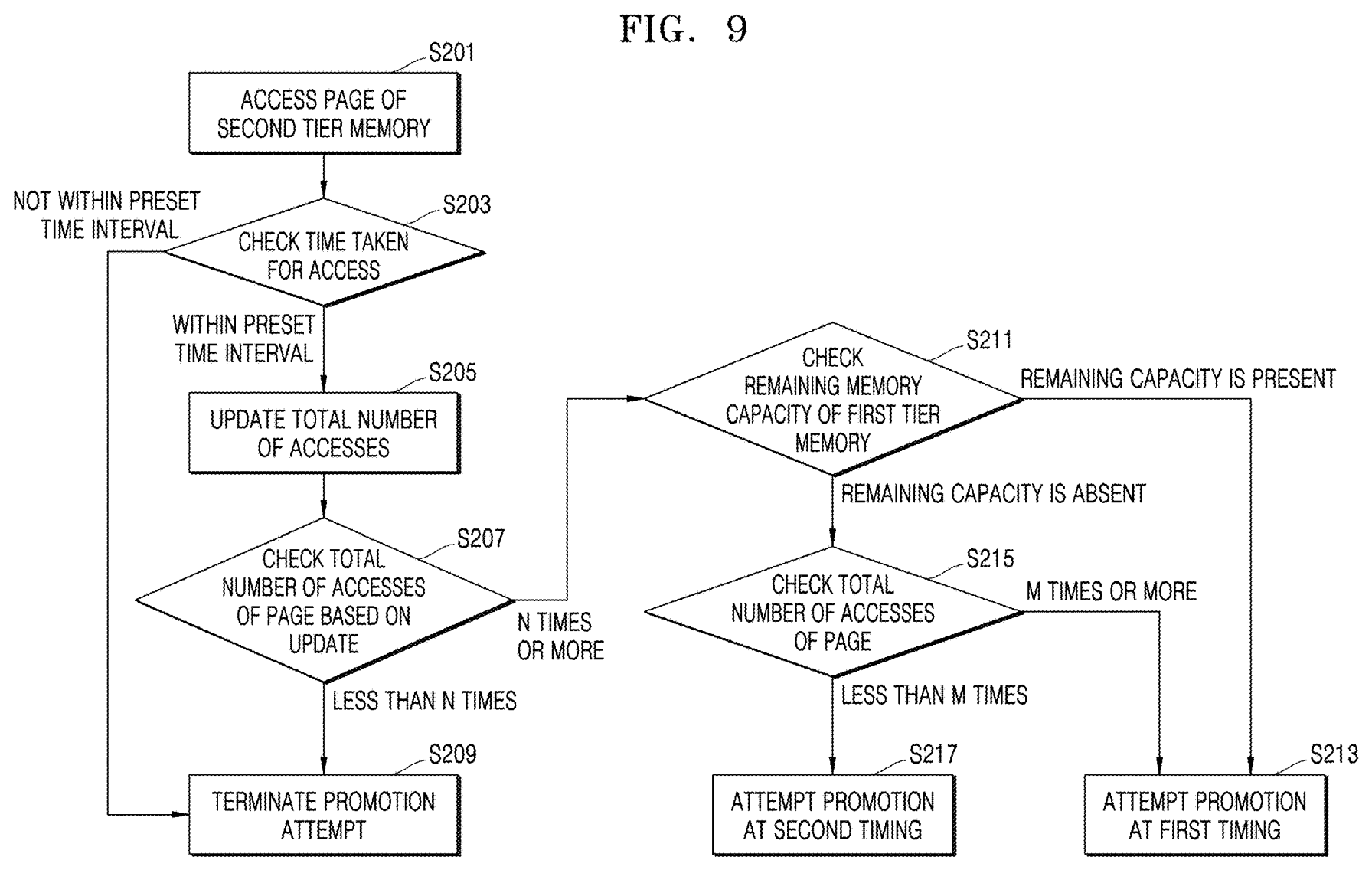

S201 — ACCESS PAGE OF SECOND TIER MEMORY

S203 — CHECK TIME TAKEN FOR ACCESS

NOT WITHIN PRESET TIME INTERVAL

WITHIN PRESET TIME INTERVAL

S205 — UPDATE TOTAL NUMBER OF ACCESSES

S207 — CHECK TOTAL NUMBER OF ACCESSES OF PAGE BASED ON UPDATE

N TIMES OR MORE

LESS THAN N TIMES

S209 — TERMINATE PROMOTION ATTEMPT

S211 — CHECK REMAINING MEMORY CAPACITY OF FIRST TIER MEMORY

REMAINING CAPACITY IS PRESENT

REMAINING CAPACITY IS ABSENT

S213 — ATTEMPT PROMOTION AT FIRST TIMING

S215 — CHECK TOTAL NUMBER OF ACCESSES OF PAGE

M TIMES OR MORE

LESS THAN M TIMES

S217 — ATTEMPT PROMOTION AT SECOND TIMING

COMPUTING DEVICE AND METHOD THEREOF FOR A PROMOTION METHOD IN A TIERED MEMORY SYSTEM

CROSS-REFERENCE TO RELATED APPLICATION

This application is based on and claims priority under 35 U.S.C. § 119 to Korean Patent Application No. 10-2023-0193178, filed on Dec. 27, 2023, in the Korean Intellectual Property Office, the entire contents of which is incorporated by reference herein in its entirety.

BACKGROUND

The technical idea of the inventive concept relates to a computing device and an operating method thereof, and, more specifically, to a promotion method in a tiered memory system.

A tiered memory system is a memory system proposed to meet the increasing memory requirements of applications. The tiered memory system includes fast memory that has a small capacity with fast access speed and slow memory that has a large capacity with slow access speed. As the memory requirements of applications increase, promotion attempts of the pages of lower layer memory to upper layer memory can occur frequently.

SUMMARY

It is an object of the technical idea of the inventive concept to propose a promotion method in a tiered memory system.

To achieve the above-described object, a method of operating a computing device including a first tier memory and a second tier memory, according to an aspect of the inventive concept, may include accessing a page of the second tier memory, checking a time taken for the accessing the page of the second tier memory, checking a total number of accesses of the page based on the time taken for the accessing, and determining whether to terminate promotion of the page to the first tier memory and a timing of the promotion, based on the total number of accesses of the page. The determining whether to terminate the promotion and the timing of the promotion may include terminating the promotion if the total number of accesses is less than N times, where N is a positive integer, attempting the promotion at one of a first timing and a second timing if the total number of accesses is equal to or greater than the N times and less than M times, where M is a positive integer greater than N, and attempting the promotion at the first timing if the total number of accesses is equal to or greater than the M times. A memory capacity of the first tier memory may be less than a memory capacity of the second tier memory. The first timing may be temporally earlier than the second timing.

A computing device according to an aspect of the inventive concept may include a first tier memory, a second tier memory having a larger memory capacity than the first tier memory, and a processor. The processor may be configured to access a page of the second tier memory, check a time taken for the access, check a total number of accesses of the page based on the time taken for the access, and determine whether to terminate promotion of the page to the first tier memory and a timing of the promotion based on the total number of accesses of the page. The processor may be configured to terminate the promotion if the total number of accesses is less than N times, attempt the promotion at one of a first timing and a second timing if the total number of accesses is equal to or greater than the N times and less than M times, and attempt the promotion at the first timing if the total number of accesses is equal to or greater than the M times. The first timing may be temporally earlier than the second timing.

A method of operating a computing device including a first tier memory and a second tier memory, according to an aspect of the inventive concept, may include accessing a page of the second tier memory, checking a time taken for the accessing, checking a total number of accesses of the page based on the time taken for the accessing, updating the total number of accesses of the page, checking a total number of accesses of the page based on the updating, checking a remaining memory capacity of the first tier memory if the total number of accesses is equal to or greater than N times, attempting the promotion of the page to the first tier memory at a first timing if the first tier memory has the remaining memory capacity, checking a total number of accesses of the page if the first tier memory does not have the remaining memory capacity, attempting the promotion at a second timing if the total number accesses is less than M times, and attempting the promotion at the first timing if the total number of accesses is equal to or greater than M times. A memory capacity of the first tier memory may be less than a memory capacity of the second tier memory. The first timing may be temporally earlier than the second timing.

BRIEF DESCRIPTION OF THE DRAWINGS

Embodiments will be more clearly understood from the following detailed description taken in conjunction with the accompanying drawings in which:

FIG. 9 shows an operation process of a computing device according to an example embodiment;

DETAILED DESCRIPTION OF THE EMBODIMENTS

Hereinafter, various embodiments will be described with reference to the accompanying drawings.

Like reference numbers refer to like elements throughout. It will be understood that, although the terms first, second, third etc. may be used herein to describe various elements, components, and/or steps, these elements, components, and/or steps, should not be limited by these terms. Unless the context indicates otherwise, these terms are only used to distinguish one element, component, or step from another element, component, or step, for example as a naming convention. Thus, a first element, component, or step discussed below in one section of the specification could be termed a second element, component, or step in another section of the specification or in the claims without departing from the teachings of the present invention. In addition, in certain cases, even if a term is not described using "first," "second," etc., in the specification, it may still be referred to as "first" or "second" in a claim in order to distinguish different claimed elements from each other.

Figure 1:
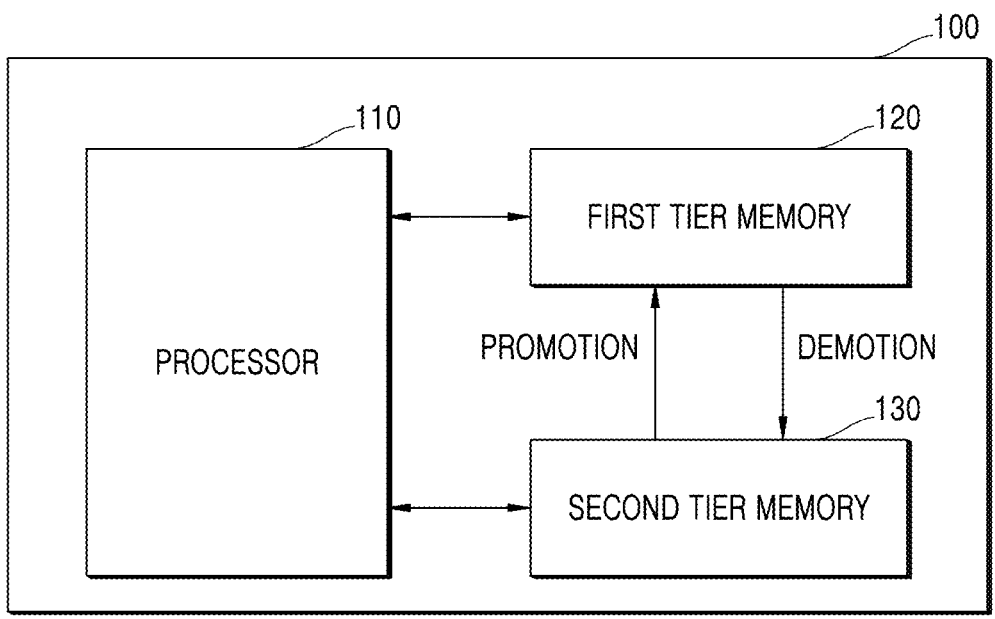
FIG. 1 is a block diagram of a computing device according to an example embodiment.

FIG. 1 is a block diagram of a computing device according to an example embodiment.

Referring to FIG. 1, a computing device 100 may include a processor 110, a first tier memory 120, and a second tier memory 130.

A memory capacity of the first tier memory 120 may be less than a memory capacity of the second tier memory 130. The speed of access to the first tier memory 120 may be higher than the speed of access to the second tier memory 130. Such a tiered memory system has been proposed to accommodate the increasing memory capacity required by applications. The first tier memory 120 may be referred to as a fast memory and the second tier memory 130 may be referred to as a slow memory. Promotion may be an operation of moving a page of the second tier memory 130 to the first tier memory 120, which is an upper tier. That is, promotion may mean moving data of the second tier memory 130 to the first tier memory 120. Demotion may be an operation of moving a page of the first tier memory 120 to the second tier memory 130. That is, demotion may mean moving data of the first tier memory 120 to the second tier memory 130. Promotion attempts from the second tier memory 130 to the first tier memory 120 may be very frequent, and the first tier memory 120 may have a limited memory capacity. Accordingly, the inventive concept proposes a method of reducing unnecessary promotion attempts and raising the success rate of promotion attempts.

The processor 110 may access a page of the second tier memory 130. The processor 110 may check a time taken for the access to the page. The processor 110 may check a total number of accesses of the page based on the time taken for the access. For example, if the time taken for the access is less than a preset time interval, the processor 110 may check a total number of accesses. The preset time interval may be within a range of 100 ns to 1 ms. However, the preset time interval is not limited thereto. For example, if the time taken for the access is less than the preset time interval, the processor 110 may count the access to increase a total number of accesses by 1 and then check the resultant total number of accesses. For example, if the time taken for the access is equal to or greater than the preset time interval, the processor 110 may terminate a promotion attempt of the corresponding page. For example, the processor 110 may exclude the corresponding page from being a target of promotion. For example, the processor may exclude the corresponding page from being promoted. Terminating promotion may mean that the processor 110 does not make any promotion attempt of the page. As such, the processor 110 may select a page that is a target of promotion by terminating a promotion attempt of the page or checking a total number of accesses based on a time taken for an access. For example, the processor 110 may exclude a page which takes a long time to access from being a target of promotion. Accordingly, a system time that is consumed for promotion of the page may be reduced. The preset time interval may be a time interval that is predetermined by the system.

The processor 110 may determine whether to terminate a promotion attempt of the page to the first tier memory 120 and a promotion timing, based on the total number of accesses of the page. If the total number of accesses of the page is less than N times (N is a positive integer), the processor 110 may terminate the promotion attempt. For example, if the total number of accesses is less than N times, the processor 110 may identify the corresponding page as a cold page that is unimportant and then terminate the promotion attempt. Accordingly, a system time that is consumed for promotion may be reduced. If the total number of accesses is between N times and M times (M is a positive integer), the processor 110 may attempt promotion of the page at any of a first timing and a second timing. M may be greater than N. If the total number of accesses is equal to or greater than M times, the processor 110 may attempt promotion at the first timing. For example, if the total number of accesses is equal to or greater than N times and less than M times, the processor 110 may identify the corresponding page as a warm page having medium importance and may attempt promotion at the second timing that is temporally later than the timing at which a promotion attempt of a hot page is made. If the total number of accesses is equal to or greater than M times, the processor 110 may identify the corresponding page as a hot page having high importance and may attempt promotion at the first timing that is temporally earlier than the timing at which a promotion attempt of a warm page is made.

The first timing may have temporal priority over the second timing. That is, the first timing may be earlier than the second timing. The first timing may be before termination of a kernel mode period related to access. The second timing may be after termination of a kernel mode period related to access. Demotion may be executed after termination of a kernel mode. In this case, the processor 110 may attempt promotion at the second timing.

The processor 110 may check the remaining memory capacity of the first tier memory 120. If the total number of accesses is equal to or greater than N times and less than M times and the first tier memory 120 has a remaining memory capacity, the processor 110 may attempt promotion at the first timing. If the total number of accesses is equal to or greater than N times and less than M times and the first tier memory 120 has no remaining memory capacity, the processor 110 may attempt promotion at the second timing. If the remaining memory capacity is equal to or greater than a specific threshold value, the processor 110 may determine that the first tier memory 120 has a remaining memory capacity, and if the remaining memory capacity is less than the specific threshold value, the processor 110 may determine that the first tier memory 120 has no remaining memory capacity. The second timing may be a time at which a promotion attempt is executed after background demotion. The background demotion is described in detail below with reference to FIG. 10. In some example embodiments, the N times may be 3 times, and the M times may be 4 times, although embodiments are not limited thereto. M may be greater than N, although embodiments are not limited thereto.

The processor 110 may check the remaining memory capacity of the first tier memory 120. If the total number of accesses is equal to or greater than M times and the first tier memory 120 has a remaining memory capacity, the processor 110 may attempt promotion at the first timing without waiting for demotion. If the total number of accesses is equal to or greater than M times and the first tier memory 120 has no remaining memory capacity, the processor 110 may attempt promotion at the first timing after waiting for demotion. In this case, the first timing may be a time at which a promotion attempt is executed after direct demotion. The direction demotion is described in detail below with reference to FIG. 10.

According to an embodiment, each of the first tier memory 120 and the second tier memory 130 may be any of dynamic random access memory (DRAM), magnetic random access memory (MRAM), and phase change memory (PCM). The first tier memory 120 and the second tier memory 130 may be based on various devices without being limited to the above-described embodiments.

The computing device 100 according to the inventive concept may efficiently use the limited capacity of the first tier memory 120 in the tiered memory system.

The computing device 100 according to the inventive concept may reduce unnecessary promotion attempts and raise the success rate of promotion.

The computing device 100 according to the inventive concept may reduce a time taken for promotion in a kernel mode. For example, the computing device 100 may reduce a system time.

A promotion method according to the inventive concept may also be applicable to a tiered memory system having three layers or more and is not limited to the above-described embodiment of the tiered memory system having two layers.

Figure 2:
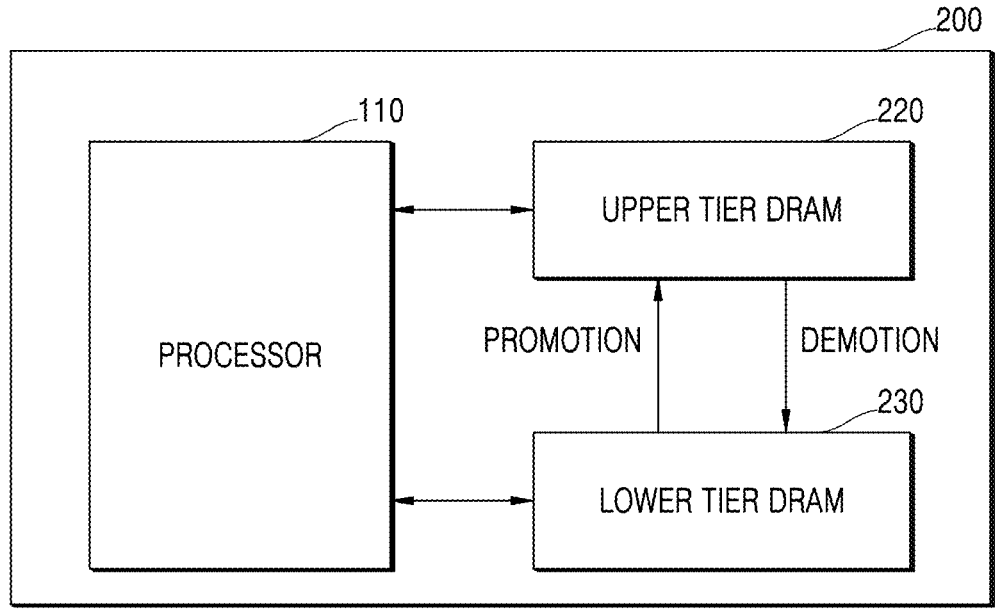
FIG. 2 is a block diagram of a computing device according to an example embodiment.

FIG. 2 is a block diagram of a computing device according to an example embodiment. FIG. 2 is described with reference to FIG. 1 and repeated descriptions therebetween are omitted.

A computing device 200 of FIG. 2 may be an embodiment of the computing device 100 of FIG. 1. Referring to FIG. 2, the computing device 200 may include the processor 110, upper tier DRAM 220, and lower tier DRAM 230. The upper tier DRAM 220 may correspond to the first tier memory 120 of FIG. 1, and the lower tier DRAM 230 may correspond to the second tier memory 130 of FIG. 1. A memory capacity of the upper tier DRAM 220 may be less than a memory capacity of the lower tier DRAM 230.

According to an embodiment, the upper tier DRAM 220 may be dual in-line memory module (DIMM) form factor-based DRAM. The lower tier DRAM 230 may be compute express link (CXL)-based DRAM.

Figure 3:
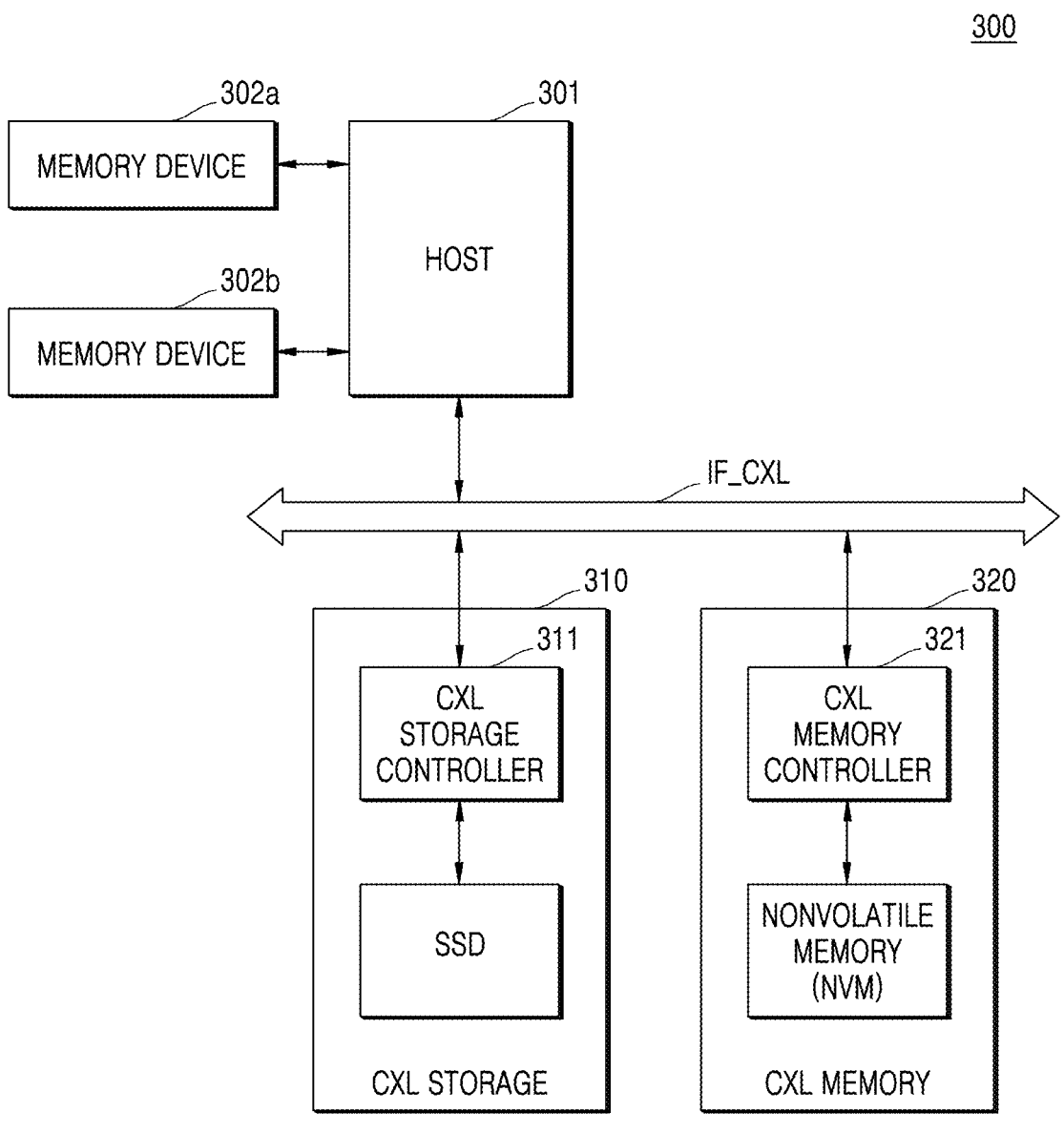
FIG. 3 is a block diagram of a computing system to which a storage system according to an example embodiment is applied.

FIG. 3 is a block diagram of a computing system to which a storage system according to an example embodiment is applied. FIG. 3 is described with reference to FIG. 1 and repeated descriptions therebetween are omitted.

Referring to FIG. 3, a computing system 300 may include a host 301, a plurality of memory devices 302a and 302b, a CXL storage 310, and a CXL memory 320. According to an embodiment, the computing system 300 may be included in user devices, such as a personal computer, a laptop computer, a server, a media player, a digital camera, etc., or in automotive devices, such as a navigation system, a black box, vehicle electrical equipment, etc. Also, the computing system 300 may be a mobile system, such as a mobile phone, a smartphone, a tablet personal computer (PC), a wearable device, a healthcare device, or an internet of things (IoT) device.

The host 301 may control the overall operation of the computing system 300. According to an embodiment, the host 301 may be one of various processors, such as a central processing unit (CPU), a graphics processing unit (GPU), a neural processing unit (NPU), a data processing unit (DPU), etc. According to an embodiment, the host 101 may include a single-core processor or a multi-core processor.

The plurality of memory devices 302a and 302b may be used as main memories or system memories of the computing system 300. According to an embodiment, each of the plurality of memory devices 302a and 302b may be a DRAM device and have a DIMM form factor. However, the scope of the inventive concept is not limited thereto, and the plurality of memory devices 302a and 302b may include a non-volatile memory, such as phase-change random access memory (PRAM), resistive random access memory (RRAM), and MRAM.

The plurality of memory devices 302a and 302b may directly communicate with the host 301 through a double data rate (DDR) interface. According to an embodiment, the host 301 may include a memory controller configured to control the plurality of memory devices 302a and 302b. However, the scope of the inventive concept is not limited thereto, and the plurality of memory devices 302a and 302b may communicate with the host 301 through various interfaces.

The CXL storage 310 may include a CXL storage controller 311 and a solid state drive (SSD). The CXL storage controller 311 may store data in the SSD or transmit data stored in the SSD to the host 301 according to a control by the host 301.

The CXL memory 320 may include a CXL memory controller 321 and a buffer memory. The CXL memory controller 321 may store data in the buffer memory or transmit data stored in the buffer memory to the host 301 according to a control by the host 301. According to an embodiment, the buffer memory may be DRAM, although not limited thereto.

According to an embodiment, the host 301, the CXL storage 310, and the CXL memory 320 may share the same interface. For example, the host 301, the CXL storage 310, and the CXL memory 320 may communicate with each other through a CXL interface IF-CXL. According to an embodiment, the CXL interface IF-CXL may indicate a low-latency and high-bandwidth link that enables various connections between accelerators, memory devices, or various electronic devices by supporting coherency, memory access, and dynamic protocol muxing of input/output (I/O) protocols.

According to an embodiment, the CXL storage 310 may include no separate buffer memory for storing or managing map data. In this case, the CXL storage 310 may require a buffer memory for storing or managing map data. According to an embodiment, at least one area of the CXL memory 320 may be used as a buffer memory of the CXL storage 310. In this case, a mapping table that is managed by the CXL storage controller 311 of the CXL storage 310 may be stored in the CXL memory 320. For example, at least one area of the CXL memory 320 may be allocated as a buffer memory (that is, a dedicated area for the CXL storage 310) of the CXL storage 310 by the host 301.

According to an embodiment, the CXL storage 310 may access the CXL memory 320 through the CXL interface IF_CXL. For example, the CXL storage 310 may store a mapping table in the allocated area of the CXL memory 320 or read a mapping table stored in the allocated area of the CXL memory 320. The CXL memory 320 may store data (for example, map data) in the buffer memory or transmit data (for example, map data) stored in the buffer memory to the CXL storage 310, according to a control by the CXL storage 310.

According to an embodiment, the CXL storage 310 may use at least one area of the CXL memory 320 located outside the CXL storage 310, as a buffer memory. In this case, because the CXL memory 320 is separated from the CXL storage 310, the CXL memory 320 may have a large capacity. Accordingly, even though a capacity of map data increases according to an increase in capacity of the CXL storage 310, the map data may be normally managed by the CXL memory 320.

According to an embodiment, the CXL storage controller 311 of the CXL storage 310 may communicate with the host 301 and the CXL memory 320 (that is, the buffer memory) through the CXL interface IF_CXL. In other words, the CXL storage controller 311 of the CXL storage 310 may communicate with the host 301 and the CXL memory 320 and use some area of the CXL memory 320 as a buffer memory, through the same kind of interface or a common interface. However, the inventive concept is not limited thereto, and the host 301, the CXL storage 310, and the CXL memory 320 may communicate with each other based on various computing interfaces, such as GEN-Z protocol, NVLink protocol, CCIX protocol, and Open CAPI protocol.

According to an embodiment, the plurality of memory devices 302a and 302b may be the first tier memory 120, and the CXL memory 320 may be the second tier memory 130. Like the processor 110 of FIG. 1, the host 301 may control the plurality of memory devices 302a and 302b and the CXL memory 320. As a detailed example, the host 301 may classify a page of the CXL memory 320 as any of a cold page, a warm page, and a hot page according to importance of the page. For example, the host 301 may determine whether there has been a recent access to the corresponding page, and if the host 301 determines that there has been no recent access within a preset time interval, the host 301 may classify the page as a cold page. The page classified as a cold page by the host 301 may be excluded from a target of promotion. For example, the host 301 may check a total number of accesses of the corresponding page and, if the total number of accesses is equal to or greater than N times and less than M times within a preset time interval, the host 301 may classify the page as a warm page. For example, the host 301 may check a total number of accesses of the corresponding page and, if the total number of accesses is equal to or greater than M times within a preset time interval, the host 301 may classify the page as a hot page.

Figure 4:
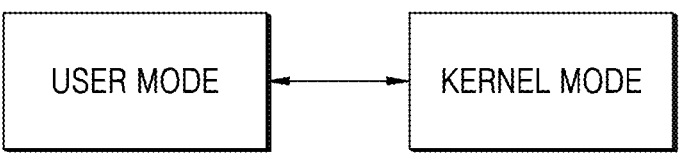
FIG. 4 is a view for describing a user mode and a kernel mode.

FIG. 4 is a view for describing a user mode and a kernel mode. FIG. 4 is described with reference to FIG. 1.

An operating system may manage a memory by dividing the memory into a user area and a kernel area to manage the computing device 100. A memory space (for example, a code area, a data area, a stack area, and a heap area) used by an application to operate is referred to as a user area. A memory space, which is an area except for the user area and required to execute the operating system, is referred to as a kernel area. The computing device 100 may operate in one of a user mode and a kernel mode and may change the mode at any time.

In the inventive concept, a kernel mode period and a kernel mode may be periods for which the computing device 100 operates in the kernel area, and a user mode and a user mode period may be periods for which the computing device 100 operates in the user area.

Figure 5:
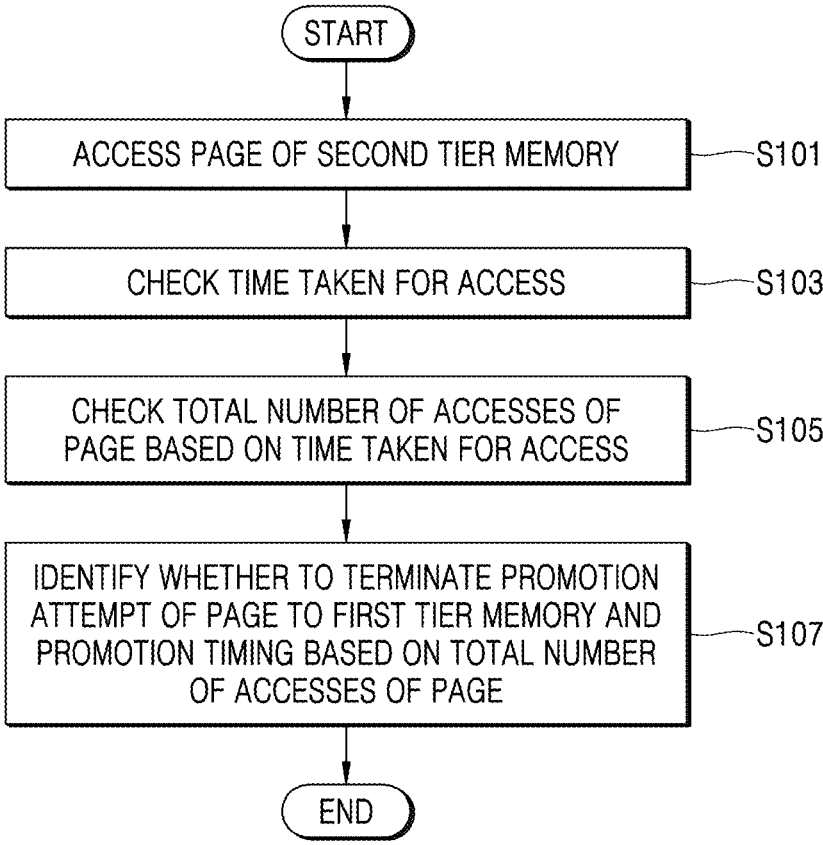
FIG. 5 shows an operation process of a computing device according to an example embodiment.
Figure 6:
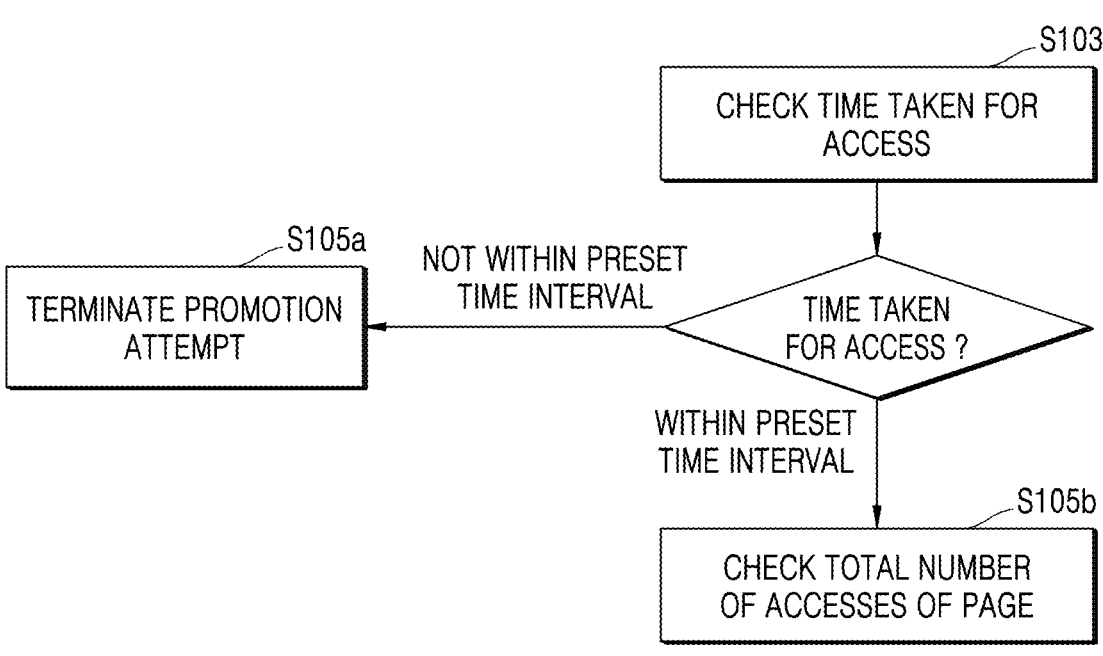
FIG. 6 shows an embodiment in which a computing device according to an example embodiment checks a total number of accesses based on a time taken for an access.
Figure 7:
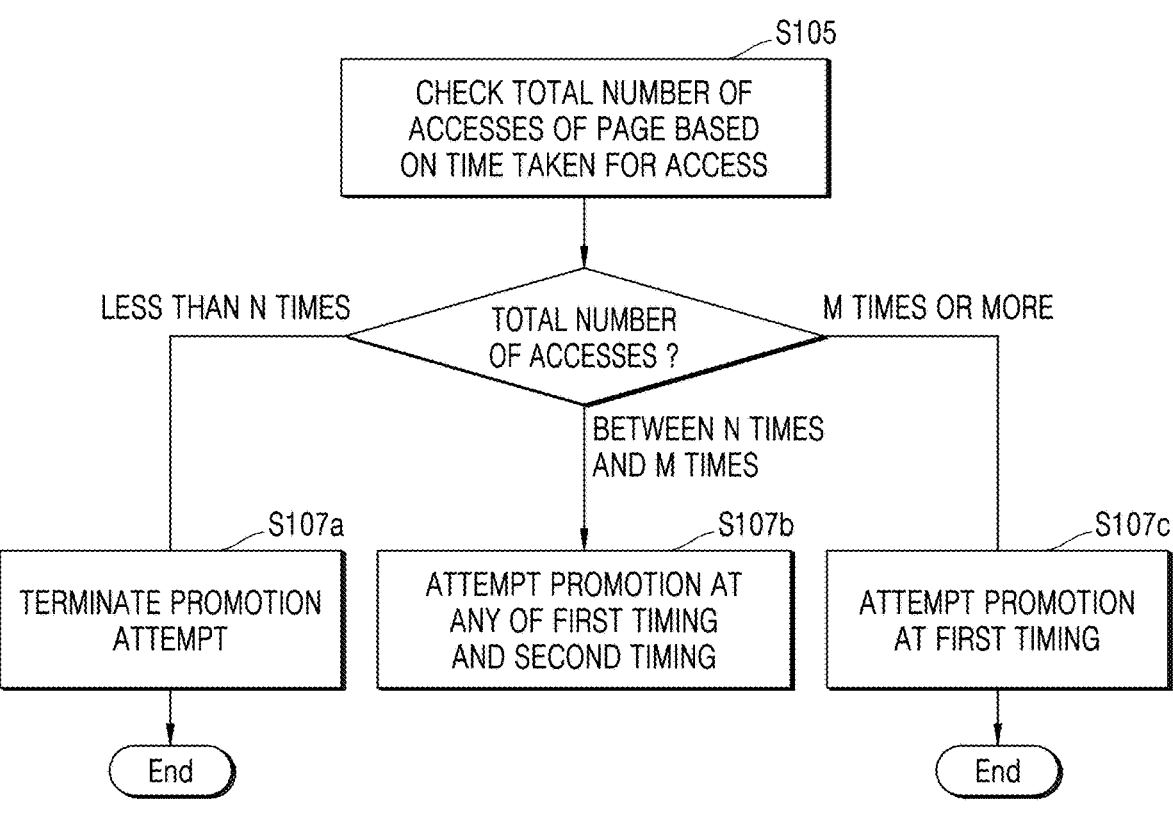
FIG. 7 shows an embodiment in which a computing device according to an example embodiment identifies whether to terminate promotion to a first tier memory and a promotion timing.
Figure 8:
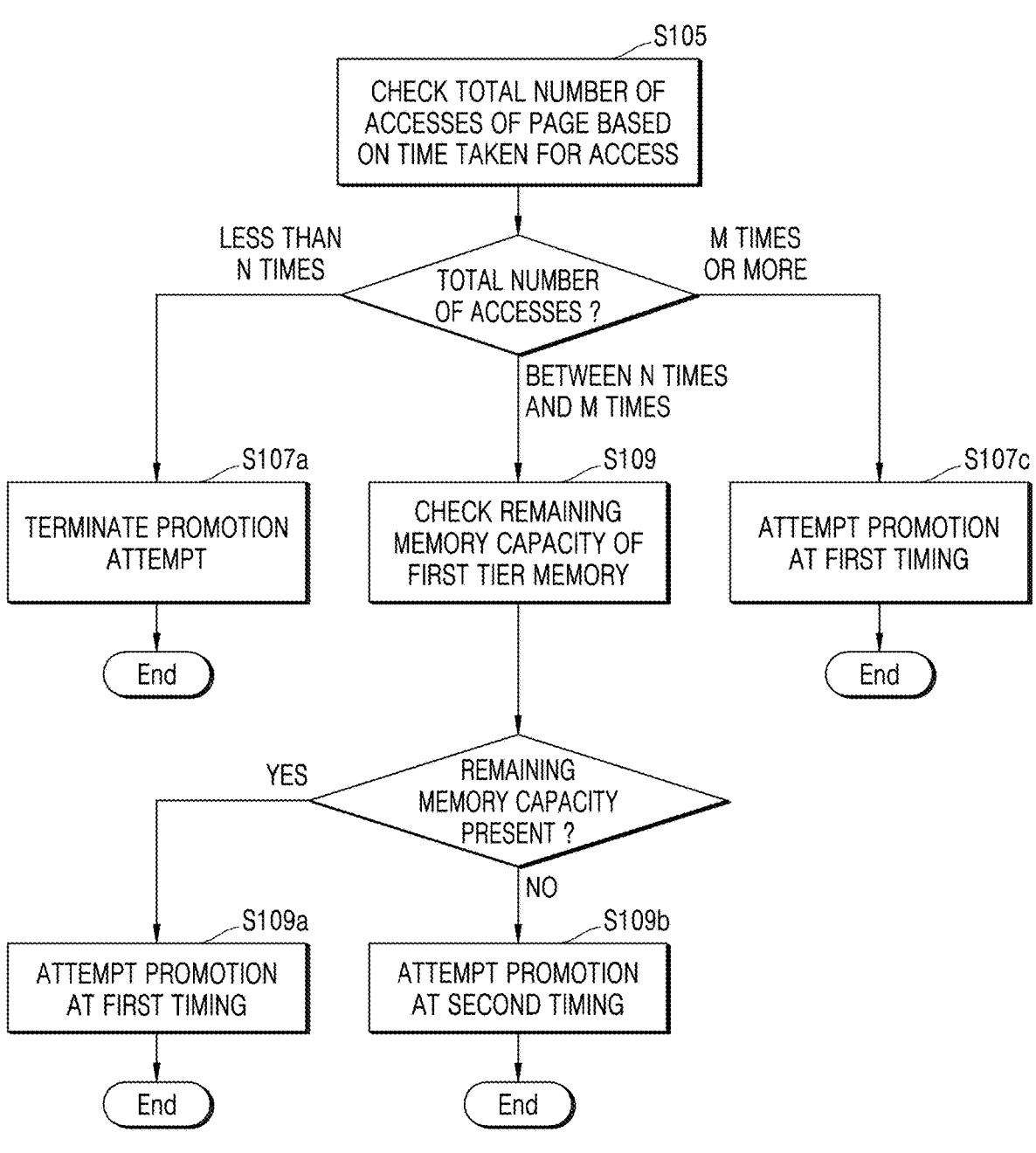
FIG. 8 shows an embodiment in which a computing device according to an example embodiment attempts promotion at any of a first timing and a second timing.

FIG. 5 shows an operation process of a computing device according to an example embodiment. FIG. 6 shows an embodiment in which a computing device according to an example embodiment checks a total number of accesses based on a time taken for an access. FIG. 7 shows an embodiment in which a computing device according to an example embodiment identifies whether to terminate promotion to a first tier memory and a promotion timing. FIG. 8 shows an embodiment in which a computing device according to an example embodiment attempts promotion at any of a first timing and a second timing. FIGS. 5 to 7 are described with reference to FIG. 1.

Referring to FIG. 5, in operation S101, the computing device 100 may access a page of the second tier memory 130.

In operation S103, the computing device 100 may check a time taken for an access.

In operation S105, the computing device 100 may check a total number of accesses of the page based on the time taken for the access. For example, referring to FIG. 6, if the time taken for the access is equal to or greater than a preset time interval, the computing device 100 may terminate a promotion attempt, in operation S105a. Terminating promotion may mean that the computing device 100 does not attempt promotion. For example, if the time taken for the access is equal to or greater than the preset time interval, the computing device 100 may check a total number of accesses and may not execute promotion. That the time taken for the access to the page is not within the preset time interval may mean that the page has not frequently been used. Therefore, the computing device 100 may exclude the page from being a target of promotion. For example, the computing device 100 may determine recency of an access to the page based on a time taken for the access to the page. In operation S105b, if the time taken for the access is less than the preset time interval, the computing device 100 may check a total number of accesses of the page of the second tier memory 130.

Referring again to FIG. 5, in operation S107, the computing device 100 may determine whether to terminate promotion of the page to the first tier memory 120 and a promotion timing based on the total number of accesses of the page. For example, referring to FIG. 7, if the total number of accesses is less than N times, the computing device 100 may terminate a promotion attempt, in operation S107a. If the total number of accesses is equal to or greater than N times and less than M times, the computing device 100 may attempt promotion at any of a first timing and a second timing. For example, referring to FIG. 8, if the total number of accesses is equal to or greater than N times and less than M times, the computing device 100 may check the remaining memory capacity of the first tier memory 120, in operation S109. If the first tier memory 120 has a remaining memory capacity, the computing device 100 may attempt promotion at the first timing, in operation S109a. If the first tier memory 120 has no remaining memory capacity, the computing device 100 may attempt promotion at the second timing, in operation S109b. In the case in which the remaining memory capacity is equal to or greater than a preset threshold value, the computing device 100 may determine that there is a remaining memory capacity, and in the case in which the remaining memory capacity is less than the preset threshold value, the computing device 100 may determine that there is no remaining memory capacity.

If the total number of accesses is equal to or greater than M times, the computing device 100 may attempt promotion at the first timing, in operation S107c. If the total number of accesses is equal to or greater than M times, the computing device 100 may check the remaining memory capacity of the first tier memory 120. If the total number of accesses is equal to or greater than M times and the first tier memory 120 has a remaining memory capacity, the computing device 100 may attempt promotion at the first timing without waiting for demotion. If the total number of accesses is equal to or greater than M times and the first tier memory 120 has no remaining memory capacity, the computing device 100 may attempt promotion at the first timing after waiting for demotion. The first timing may have temporal priority over the second timing.

FIG. 9 shows an operation process of a computing device according to an example embodiment. FIG. 9 is described with reference to FIG. 1, and repeated descriptions therebetween are omitted.

Referring to FIG. 9, in operation S201, the computing device 100 may access a page of the second tier memory 130. A memory capacity of the first tier memory 120 may be less than a memory capacity of the second tier memory 130.

In operation S203, the computing device 100 may check a time taken for the access.

In operation S205, if the time taken for the access is less than a preset time interval, the computing device 100 may update a total number of accesses. For example, the computing device 100 may check a total number of accesses of the page based on the time taken for the access and may increase the total number of accesses by 1. As a detailed example, if the time taken for the access is less than the preset time interval, the computing device 100 may check a total number of accesses and increase the total number of accesses by 1. In operation S209, if the time taken for the access is equal to or greater than the preset time interval, the computing device 100 may terminate the promotion attempt without the promotion.

In operation S207, the computing device 100 may check a total number of accesses of the page based on the updating. For example, the computing device 100 may check a total number of accesses increased by 1.

In operation S211, if the total number of accesses is equal to or greater than N times, the computing device 100 may check the remaining memory capacity of the first tier memory 120. In operation S209, if the total number of accesses is less than N times, the computing device 100 may terminate the promotion attempt.

The computing device 100 may determine whether the accessed page is a suitable page for promotion. More specifically, the computing device 100 may determine that the page of the second tier memory 130 is unsuitable as a target of promotion, according to operations S203 to S209 described above.

In operation S213, if the first tier memory 120 has a remaining memory capacity (e.g., remaining capacity is present), the computing device 100 may attempt promotion at the first timing.

In operation S215, if the first tier memory 120 has no remaining memory capacity (e.g., remaining capacity is absent), the computing device 100 may check a total number of accesses of the page. If the total number of accesses is less than M times, the computing device 100 may attempt promotion at the second timing, in operation S217. If the total number of accesses is equal to or greater than M times, the computing device 100 may attempt promotion at the first timing, in operation S213.

The first timing and the second timing may be after demotion from the first tier memory 120 to the second tier memory 130 is executed. For example, promotion may be executed after demotion is performed. For example, promotion may be executed after background demotion or direct demotion is executed. The first timing may be temporally earlier than the second timing.

Figure 10:
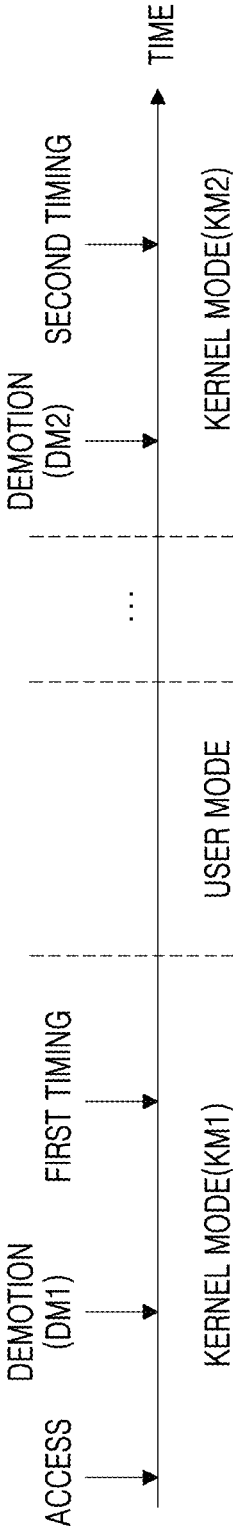
FIG. 10 is a view for describing a first timing and a second timing.

FIG. 10 is a view for describing a first timing and a second timing. FIG. 10 is described with reference to FIGS. 1 to 9.

Referring to FIG. 10, after a kernel mode KM1, mode conversion to a user mode may occur. The computing device 100 may frequently change the mode to any of the kernel mode and the user mode. The kernel mode KM1 is also referred to as an access-related kernel mode. A kernel mode KM2 may be a kernel period that is executed after the access-related kernel mode KM1 is executed. The computing device 100 may access a page of the second tier memory 130 in the kernel mode KM1.

The computing device 100 may classify the page of the second tier memory 130 as any of a cold page, a warm page, and a hot page according to importance of the page. For example, the computing device 100 may determine whether there has been a recent access to the page and if the computing device 100 determines that there has been no recent access to the page, the computing device 100 may classify the page as a cold page. As a result of classifying of the page as the cold page, the computing device 100 may exclude the page from being a target of promotion. For example, the computing device 100 may check a total number of accesses of the page, and if the total number of accesses is equal to or greater than N times and less than M times, the computing device 100 may classify the page as a warm page. For example, the computing device 100 may check a total number of accesses of the page, and if the total number of accesses is equal to or greater than M times, the computing device 100 may classify the page as a hot page.

As a result of classifying of the page as the warm page, the computing device 100 may attempt promotion at any of the first timing and the second timing. For example, the computing device 100 may check the remaining memory capacity of the first tier memory 120. If the first tier memory 120 has a remaining memory capacity, the computing device 100 may attempt promotion at the first timing without waiting for demotion DM1. For example, the computing device 100 may attempt promotion at the first timing although demotion DM1 is not executed. If the first tier memory 120 has no remaining memory capacity, the computing device 100 may attempt promotion at the second timing. If the first tier memory 120 has no remaining memory capacity, the computing device 100 may attempt promotion at the second timing after demotion DM2 is executed. The demotion DM2 may be referred to as background demotion. The background demotion may mean demotion that is executed in the kernel mode KM2 after the access-related kernel mode KM1, not in the access-related kernel mode KM1.

As a result of classifying of the page as the hot page, the computing device 100 may attempt promotion at the first timing. For example, if the first tier memory 120 has a remaining memory capacity, the computing device 100 may attempt promotion at the first timing without waiting for demotion. For example, the computing device 100 may attempt promotion at the first timing although no demotion DM1 is executed. For example, if the first tier memory 120 has no remaining memory capacity, the computing device 100 may wait for demotion DM1 to promote the hot page at the first timing. After demotion DM1 is executed in the kernel mode KM1, the computing device 100 may attempt promotion at the first timing. Demotion DM1 that is executed in an access-related kernel mode KM1 may be referred to as direct demotion.

Figure 11:
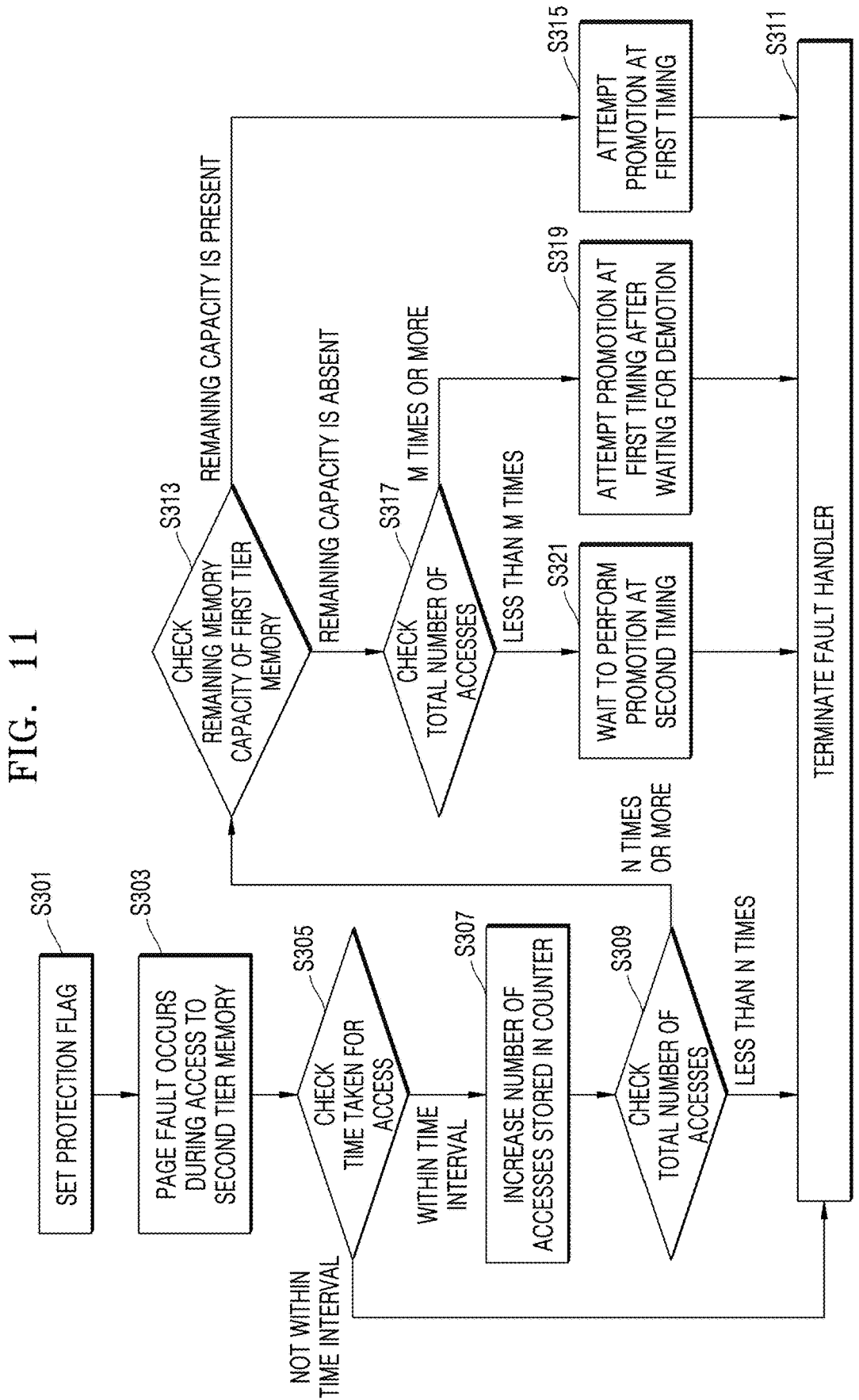
FIG. 11 shows an operation process of a computing device according to an example embodiment.

FIG. 11 shows an operation process of a computing device according to an example embodiment. FIG. 11 is described with reference to FIG. 1, and repeated descriptions therebetween are omitted.

Referring to FIG. 11, in operation S301, the computing device 100 may set a protection flag. For example, a Linux scheduler may set a protection flag in a target page to promote pages existing in the second tier memory 130 at preset time intervals.

In operation S303, while the computing device 100 accesses the second tier memory 130, a page fault may occur. For example, while the computing device 100 accesses a page in which a protection flag is set, a page fault for promoting the page to the first tier memory 120 may occur. The page fault may be referred to as a NUMA hint fault. Upon occurrence of the NUMA hint fault, the computing device 100 may check a time at which the access to the corresponding page has been made, without directly performing promotion.

In operation S305, the computing device 100 may check a time taken for the access.

If the time taken for the access is less than a time interval, the computing device 100 may increase a number of accesses stored in a counter, in operation S307. The time interval may be a preset time interval, as discussed herein. Upon an access of the computing device 100 to the second tier memory 130, the computing device 100 may update meta data about the number of accesses, as described above, and recency indicating whether or not a time taken for the access is within the time interval.

If the time taken for the access is equal to or greater than the time interval, a fault handler may terminate, in operation S311. That the time taken for the access is not within the time interval may mean that the corresponding page has not been used frequently. Therefore, the page may not be classified as a target of promotion, and the NUMA hint fault may terminate. The computing device 100 may store a variable in which a value of a time interval is to be stored and a variable in which the start time of a time interval is to be stored. For example, the computing device 100 may add a variable in which a time of the start point of a time interval is to be stored to a structure that manages applications in a Linux kernel, thereby storing the time of the start point. Also, the value of the time interval may be declared through a kernel parameter, and accordingly, a user may control the time interval.

In operation S309, the computing device 100 may check a total number of accesses. If the total number of accesses is less than N times, the fault handler may terminate, in operation S311.

If the total number of accesses is equal to or greater than N times, the computing device 100 may check the remaining memory capacity of the first tier memory 120, in operation S313. If the first tier memory 120 has a remaining memory capacity (e.g., remaining capacity is present), the computing device 100 may attempt promotion at the first timing, in operation S315. Subsequently, in operation S311, the fault handler may terminate. If the first tier memory 120 having no remaining memory capacity (e.g., remaining capacity is absent), the computing device 100 may check a total number of accesses, in operation S317.

In operation S319, if the total number of accesses is equal to or greater than M times, the computing device 100 may attempt promotion at the first timing after waiting for demotion. Subsequently, in operation S311, the fault handler may terminate.

In operation S321, if the total number of accesses is less than M times, the computing device 100 may wait to perform promotion at the second timing. Subsequently, in operation S311, the fault handler may terminate. The computing device 100 may wake up kswapd as a kernel daemon that executes demotion in a background and may terminate a page fault handler. After the fault handler terminates, the computing device 100 may attempt promotion at the second timing.

For example, the computing device 100 may check a counter representing a number of accesses of the corresponding page within the time interval. For example, if a counter value is 3, the computing device 100 may classify the page as a warm page and, if the counter value is 4, the computing device 100 may classify the page as a hot page. As a result of classifying of the page as the hot page, direct demotion, instead of background demotion, may be used to secure promotion to the first tier memory 120.

Figure 12:
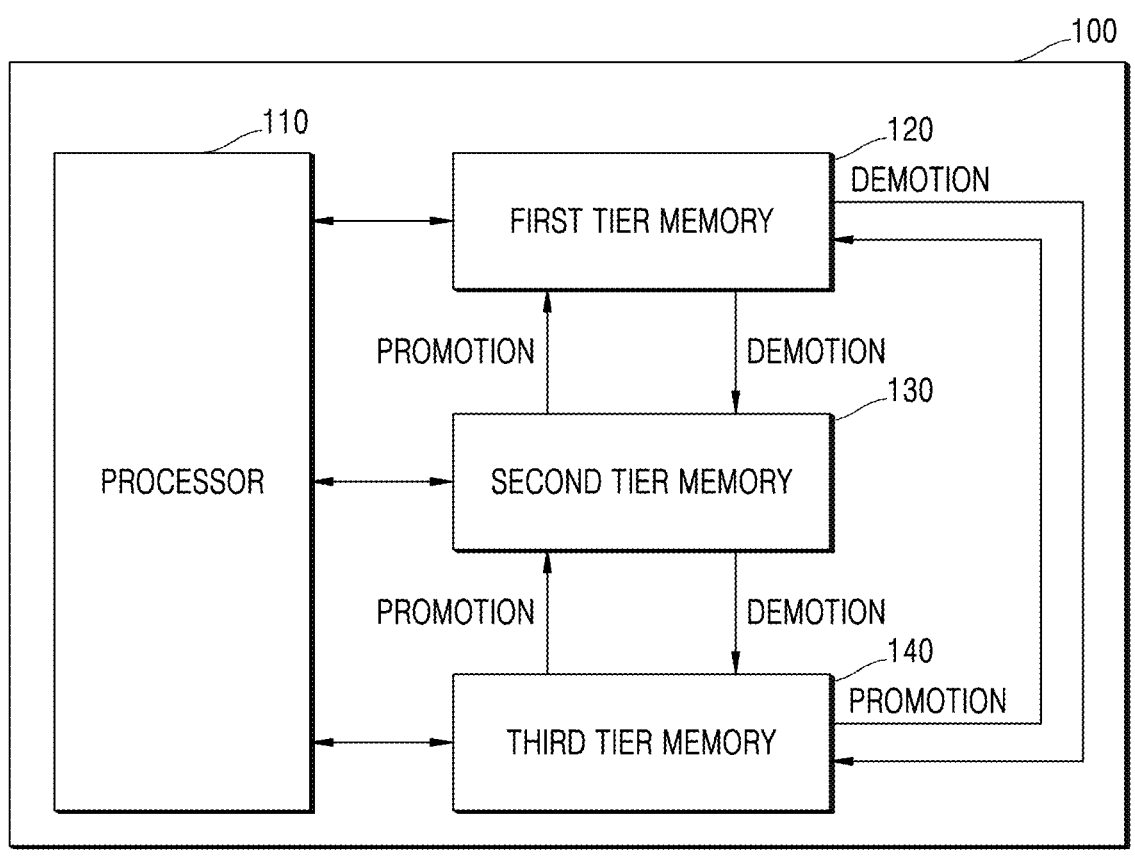
FIG. 12 is a block diagram of a computing device according to an example embodiment.

FIG. 12 is a block diagram of a computing device according to an example embodiment.

Referring to FIG. 12, the computing device 100 may include the processor 110, the first tier memory 120, the second tier memory 130, and a third tier memory 140.

A memory capacity of the first tier memory 120 may be less than a memory capacity of the second tier memory 130. The speed of an access to the first tier memory 120 may be higher than the speed of an access to the second tier memory 130. A memory capacity of the second tier memory 130 may be less than a memory capacity of the third tier memory 140. The speed of an access to the second tier memory 130 may be higher than the speed of an access to the third tier memory 140.

For example, the processor 110 may apply the promotion method according to the inventive concept to two arbitrary memories. For example, the processor 110 may apply the above-described promotion method to the first tier memory 120 and the second tier memory 130. As another example, the processor 110 may apply the above-described promotion method to the first tier memory 120 and the third tier memory 140. As another example, the processor 110 may apply the above-described promotion method to the second tier memory 130 and the third tier memory 140. Accordingly, performance degradation due to excessive promotion attempts may be prevented in a tiered memory system.

According to an embodiment, all of the first tier memory 120, the second tier memory 130, and the third tier memory 140 may be DRAMs.

The promotion method according to the inventive concept may also be applicable to a tiered memory system having various layers and is not limited to the above-described embodiment of the memory system having three layers.

So far, the embodiments have been disclosed in the accompanying drawings and specification. Specific terms used in the present specification should be considered for purposes for describing the technical concept of the inventive concept, not for purposes for limiting the meanings or the scope of the inventive concept written in the claims. Therefore, it will be understood by those of ordinary skill in the art that various modifications or other equivalent embodiments may be made from the embodiments. Accordingly, the true technical protecting range of the inventive concept should be determined according to the technical concept of the attached claims.

What is claimed is:

1. A method of operating a computing device including a first tier memory and a second tier memory, the method comprising: accessing a page of the second tier memory; checking a time taken for the accessing the page of the second tier memory; checking a total number of accesses of the page based on the time taken for the accessing; and determining whether to terminate a promotion of the page to the first tier memory and a timing of the promotion, based on the total number of accesses of the page, wherein the determining whether to terminate the promotion and the timing of the promotion comprises: terminating the promotion if the total number of accesses is less than N times, where N is a positive integer; attempting the promotion at one of a first timing and a second timing if the total number of accesses is equal to or greater than the N times and less than M times, where M is a positive integer greater than N; and attempting the promotion at the first timing if the total number of accesses is equal to or greater than the M times, wherein a memory capacity of the first tier memory is less than a memory capacity of the second tier memory, and wherein the first timing is temporally earlier than the second timing.

2. The method of claim 1, wherein the checking the total number of accesses of the page based on the time taken for the accessing comprises:
checking the total number of accesses if the time taken for the accessing is less than a preset time interval.

3. The method of claim 2, wherein the checking the total number of accesses of the page based on the time taken for the accessing comprises:
counting the access if the time taken for the accessing is less than the preset time interval to increase the total number of accesses by 1.

4. The method of claim 2, further comprising:
if the time taken for the accessing is equal to or greater than the preset time interval, terminating the attempting for the promotion.

5. The method of claim 1, wherein the first timing is before termination of a kernel mode period related to the accessing.

6. The method of claim 1,
wherein the second timing is after termination of a kernel mode period related to the accessing, and
wherein demotion is executed after the termination of the kernel mode period.

7. The method of claim 1, further comprising:
checking a remaining memory capacity of the first tier memory,
wherein the attempting the promotion at the one of the first timing and the second timing if the total number of accesses is equal to or greater than N times and less than M times comprises:
attempting the promotion at the first timing if the first tier memory has the remaining memory capacity; and
attempting the promotion at the second timing if the first tier memory does not have the remaining memory capacity.

8. The method of claim 1, further comprising:
checking a remaining memory capacity of the first tier memory,
wherein the attempting the promotion at the first timing if the total number of accesses is equal to or greater than M times comprises:

attempting the promotion at the first timing without waiting for demotion if the first tier memory has the remaining memory capacity; and
attempting the promotion at the first timing after waiting for the demotion if the first tier memory does not have the remaining memory capacity.

9. The method of claim 1, wherein the N times are 3 times, and the M times are 4 times.

10. The method of claim 1, wherein the first tier memory includes dual in-line memory module (DIMM) form factor-based dynamic random access memory (DRAM), and the second tier memory includes compute express link (CXL)-based DRAM.

11. A computing device comprising:
a first tier memory;
a second tier memory, wherein a memory capacity of the second tier memory is greater than a memory capacity of the first tier memory; and
a processor,
wherein the processor is configured to:
access a page of the second tier memory,
check a time taken for the access,
check a total number of accesses of the page based on the time taken for the access,
identify whether to terminate promotion of the page to the first tier memory and a timing of the promotion, based on the total number of accesses of the page,
terminate the promotion if the total number of accesses is less than N times, where N is a positive integer,
attempt the promotion at one of a first timing and a second timing if the total number of accesses is equal to or greater than the N times and less than M times, where M is a positive integer greater than N, and
attempt the promotion at the first timing if the total number of accesses is equal to or greater than the M times,
wherein the first timing is temporally earlier than the second timing.

12. The computing device of claim 11, wherein the processor is further configured to:
check the total number of accesses if the time taken for the access is less than a preset time interval.

13. The computing device of claim 11, wherein the processor is further configured to:
count the access if the time taken for the access is less than a preset time interval to increase the total number of accesses by 1.

14. The computing device of claim 11, wherein the processor is further configured to:
terminate an attempt for the promotion if the time taken for the access is equal to or greater than a preset time interval.

15. The computing device of claim 11, wherein the first timing is before termination of a kernel mode period related to the access.

16. The computing device of claim 11,
wherein the second timing is after termination of a kernel mode period related to the access, and
wherein demotion is executed after the termination of the kernel mode period.

17. The computing device of claim 11, wherein the processor is further configured to:
check a remaining memory capacity of the first tier memory,
attempt the promotion at the first timing if the total number of accesses is equal to or greater than N times and less than M times and the first tier memory has the remaining memory capacity, and attempt the promotion at the second timing if the total number of accesses is equal to or greater than N times and less than M times and the first tier memory does not have the remaining memory capacity.

18. The computing device of claim 11, wherein the processor is further configured to:

check a remaining memory capacity of the first tier memory, attempt the promotion at the first timing without waiting for demotion if the total number of accesses is equal to or greater than M times and the first tier memory has the remaining memory capacity, and attempt the promotion at the first timing after waiting for the demotion if the total number of accesses is equal to or greater than M times and the first tier memory does not have the remaining memory capacity.

19. The computing device of claim 11, wherein the first tier memory includes dual in-line memory module (DIMM) form factor-based dynamic random access memory (DRAM), and the second tier memory is compute express link (CXL)-based DRAM.

20. A method of operating a computing device including a first tier memory and a second tier memory, the method comprising:

16 accessing a page of the second tier memory;

checking a time taken for the accessing;

checking a total number of accesses of the page based on the time taken for the accessing;

updating the total number of accesses of the page;

checking a total number of accesses of the page based on the updating;

checking a remaining memory capacity of the first tier memory if the total number of accesses is equal to or greater than N times, where N is a positive integer;

attempting promotion of the page to the first tier memory at a first timing if the first tier memory has the remaining memory capacity;

checking the total number of accesses of the page if the first tier memory does not have the remaining memory capacity;

attempting the promotion at a second timing if the total number of accesses is less than M times, where M is a positive integer greater than N; and attempting the promotion at the first timing if the total number of accesses is equal to or greater than M times, wherein a memory capacity of the first tier memory is less than a memory capacity of the second tier memory, and wherein the first timing is temporally earlier than the second timing.

* * * * *